Oct. 8, 1940.  V. POMERNACKI  2,217,233
AUTOMOBILE FOOT PEDAL SAFETY CONTROL
Original Filed Sept. 12, 1939
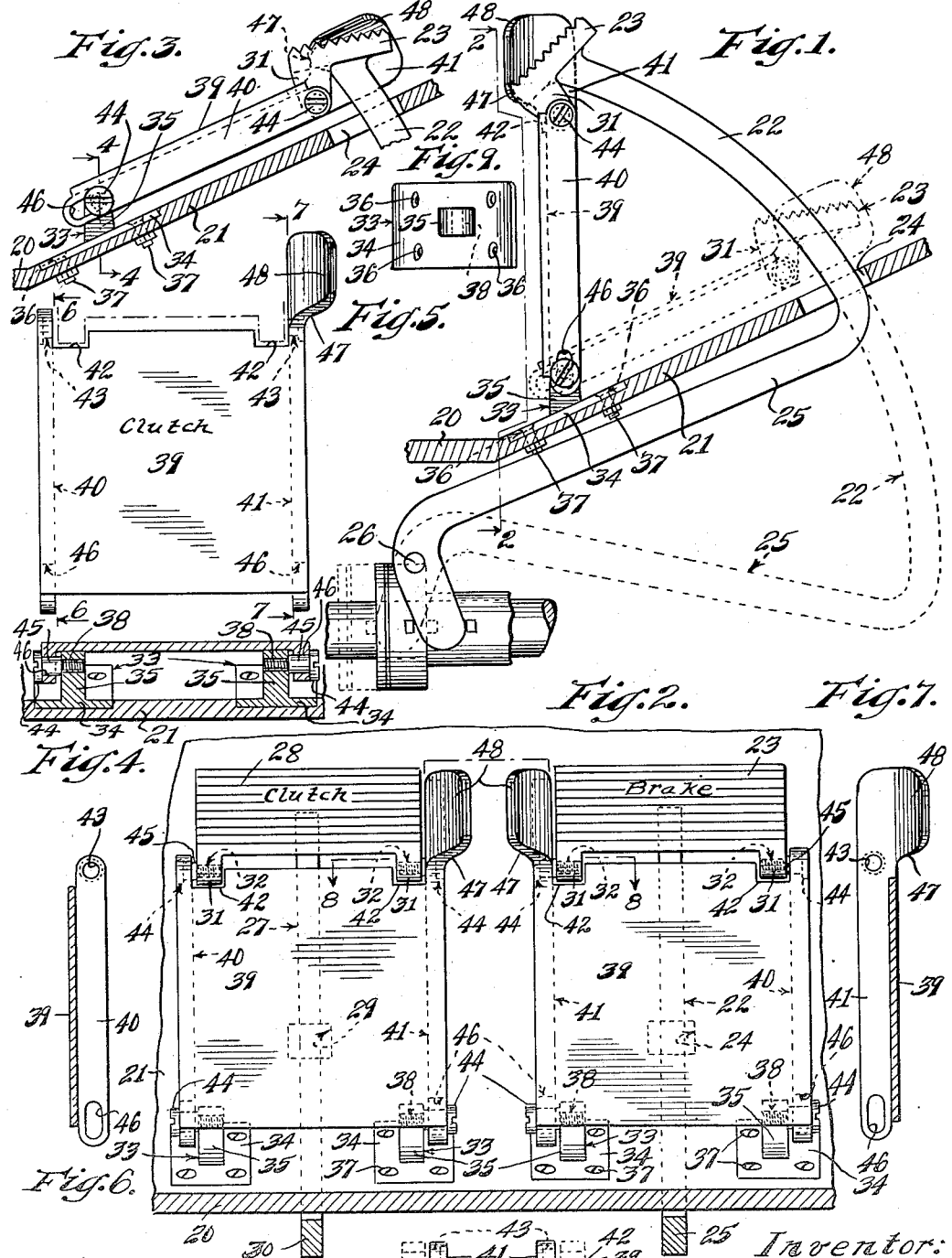
Witnesses:
C. E. Wessels
C. C. Deiro
Inventor:
Valerius Pomernacki,
By Joshua R. H. Potts
his Attorney.

Patented Oct. 8, 1940

2,217,233

UNITED STATES PATENT OFFICE 2,217,233

AUTOMOBILE FOOT PEDAL SAFETY CONTROL

Valerius Pomernacki, Chicago, Ill.

Original application September 12, 1939, Serial No. 294,472. Divided and this application April 3, 1940, Serial No. 327,593

11 Claims. (Cl. 74—566)

This invention relates to certain new and useful improvements in an automobile foot pedal safety control and more particularly to an improvement upon the structure shown in my prior Patent Number 2,163,962 dated June 27, 1939, and is a division of my prior application, Serial No. 294,472 filed September 12, 1939, and has reference more particularly to improved means for automatically guiding the feet into proper position on the brake and clutch pedals by which the automobile is controlled so as to simplify driving and minimize accidents.

As is well known, the foot-operated clutch and brake levers of the ordinary automobile project upwardly through openings in the foot-board so that the pedals carried at the upper ends of these levers are positioned side by side and at a considerable distance above the foot-board when in their uppermost positions.

In the process of driving the car, the driver must intermittently shift his right foot from the accelerator pedal to the brake pedal, and back again, and since the accelerator pedal is usually positioned rather closely adjacent to the footboard, while the brake pedal (when in its released or uppermost position) is at a considerably higher level, there is a possibility of catching the foot beneath the brake pedal. This is especially true when the driver is careless or inexperienced, or when the foot must be shifted quickly in a sudden emergency. Also it is undesirable for the driver to "ride" the clutch, that is, to keep his foot constantly on the clutch pedal, and the better drivers will ordinarily rest the left foot on the foot-board adjacent the clutch pedal, or on the floor board at some location to the rear of the pedal. When it becomes necessary to suddenly replace the left foot on the clutch pedal, there is danger of catching this foot beneath the pedal. There is also the possibility of shifting one or the other of the feet laterally onto the wrong pedal. These mistakes in properly positioning the feet on the pedals are often the cause of accidents, and the present invention is designed to minimize this danger.

Briefly described, the present invention comprises guide members, plates, bars, side members, flanges, guide portions or links pivotally mounted between or secured to and movable with the pedals at opposite sides thereof and occupying, filling or closing the entire space between the lower edge of each pedal and the foot board and outwardly of the sides thereof, particularly the clutch and brake pedals, instead of merely at the outsides as in my prior patent. By this means, these guide plates will serve to guide the feet on to the brake and clutch pedals and prevent the same from being caught beneath the pedals. They also are so arranged as to swing with the pedals but do not extend through the foot board or beneath the same, and consequently the construction is simplified and the cost of installation made more economical as well as being less likely to get out of working order. The parts are pivotally mounted on posts mounted on the foot board and project upwardly and rearwardly for pivotal movement with the pedals and in such a manner as to extend toward the pedals and properly separate the feet and maintain them on respective pedals.

Another object of the invention is to provide a safety guide means and in addition a stop or bumper plate for each pedal so as to prevent the foot from riding under the pedals at the toes and front of the pedals or from being caught at the front edges thereof as well as serving as a name plate and rendering the device more attractive and ornamental in character.

Another object of the invention is to provide means to prevent the feet from shifting from one pedal to another as well as to guide the foot on to the respective pedals in a simple and efficient manner, said guide member and means being attached to and movable with the pedal of a foot operated control lever so as to automatically direct the foot into position on the pedal and to prevent lateral movement of a foot from one pedal to another.

Other objects and advantages of this invention will be more apparent from the following detailed description of preferred forms or types of apparatus designed and operating according to the principles of this invention. In the accompanying drawing:

Fig. 1 is a partial vertical section taken in a plane between the accelerator and brake pedals and parallel to the longitudinal center line of the car with the parts raised in solid lines and down in dotted lines;

Fig. 2 is a front elevation or face view, partly in section, taken on the line 2—2 of Fig. 1;

Fig. 3 is a fragmentary view similar to Fig. 1 with the parts depressed;

Fig. 4 is a horizontal section taken on the line 4—4 of Fig. 3;

Fig. 5 is a front plan view of the plate shown in Figs. 1, 2 and 3;

Figs. 6 and 7 are vertical sections taken on the lines 6—6 and 7—7 of Fig. 5;

Fig. 8 is a fragmentary plan view taken on the line 8—8 of Fig. 2; and

Fig. 9 is a plan view of a pivot post bracket.

Referring to the drawing there is shown in Fig. 1 a portion of a car structure in vertical section taken in a plane between the accelerator and brake pedals and parallel to the longitudinal center line of the car, the accelerator pedal being omitted. The car structure shown comprises the floor board 20 and foot board 21 while 22 designates the brake lever and 23 the foot pedal thereof which operates above the foot board 21 while the angularly bent brake lever 22 operates through an opening or slot 24 in the foot board and includes a rearwardly and downwardly extending portion 25 pivoted at 26. The foot operated controls for the brakes and clutch are of the usual or any preferred construction. The clutch lever is designated at 27 and the foot pedal thereof at 28, the lever operating through an opening 29 in the foot board corresponding to the opening 24 and the rearwardly extending portion 30 thereof being in substantially all respects similar to the brake lever and pedal hereinabove described and swinging about the same axis. The brake and clutch levers and also the pedals thereof are positioned side by side but spaced a short distance apart and the usual accelerator or gas pedal (not shown) is located in the customary manner at the right of the brake pedal and usually more closely adjacent the foot board and floor board than the brake and clutch pedals, but preferably in a plane parallel to the latter and slightly below the same, although it may be located in line therewith, above the same or in any other suitable arrangement desired. The lever and pedal combinations, as already described, except for the specific construction of the brake and clutch pedals, are old and common in the art, and it will be understood that the exact form, size and inclination of these pedals vary somewhat in different types of motor cars or automobiles, but in general the relative arrangement is substantially as shown and described.

In connection with the present invention, the brake and clutch pedals are provided at their opposite ends near their lower or forward edges in view of their inclined position, with depending and forwardly inclined apertured lugs or ears 31 formed integral or attached thereto and preferably having the apertures 32 thereof tapped or threaded. Immediately beneath said lugs and secured to the foot board 21, preferably countersunken therein, are the base plates of brackets 33, the plates 34 of which are inclined. While these plates are shown flush with the foot board, they may be otherwise suitably mounted. The brackets are provided with upright pivot posts 35, while the base plates are inclined to correspond with the foot board and thus form an acute angle at the top and an obtuse angle at the bottom. Apertures 36, preferably four in number, are provided through the base plates and take screws or bolts 37 constituting fastening means for securing the pivot posts to the foot board. Each post is provided with an intermediate or lower tapped aperture 38 horizontally therethrough and a similar link or plate 39 is pivoted thereat.

The plate 39 is provided with side members, bars or guide portions in the form of forwardly extending side flanges 40 and 41 on the opposite edges thereof which may be integral or separate and fastened in position. These parts may be produced by pressing, stamping, die casting or otherwise and made straight or curved as preferred, but preferably straight as is the flat plate 39. The upper edges of the plates are provided with recesses 42 adjacent each flange forming the side members or guide portions to take the lugs or ears 31 of the foot pedals. The bars or flanges 40 and 41 forming the links, side members or guide portions are provided with upper apertures 43 to receive shoulder screws 44, the threaded portions of which are engaged with the threaded or tapped apertures 32 in the lugs 31 so that the annular shoulders thus formed are positioned outwardly of the lugs and the enlarged portions 45 of the screws are smooth and free to turn in the apertures 43. The lower end portions of the side flanges 40 and 41 are provided with elongated slots 46 extending lengthwise of the flanges to receive similar screws 44 mounted in the same manner and adapted to permit the lower ends of the flanges, and thus the plate 39, to slide thereon. The plate 39 acts as a stop or bumper plate for the foot to prevent the toe of the latter from being projected under the brake and clutch pedals and may also be used as a name plate or made ornamental for aesthetic purposes. It is vertically positioned between the pedals and the foot board in each instance and extends between the lugs 31 with the opposite side flanges 40 and 41 extending rearwardly and all of the parts are preferably rounded to avoid sharp projections or corners. The plate, through the medium of its flanges, is thus free to turn relatively on the pivots formed by the screws 44. The sides of each plate, that is each flange or guide portion formed thereby at the inside of each plate is provided on the upper end thereof with a top wing or guide plate 47 disposed in an inclined position and extending above the pedals with the opposed ends 48 thereof curved inwardly toward each other in the manner shown in the drawing so as to guide the feet over the foot pedals should the feet be inaccurately placed with reference to the brake and clutch pedals. The curved or bevelled formation of these wings is such as to insure proper guidance of the feet while preventing accidental lateral displacement thereof from the brake and clutch pedals so that the feet will not straddle both pedals or the brake pedal and the accelerator pedal at the same time with obvious results apparent to those who drive a car. However, the flanges and plates may swing down close to the foot board as shown in Figs. 1 and 3 when the pedals are depressed to apply the brakes or release the clutch. The plates are thus pivoted to extend between the foot pedals and the foot board and are pivotally mounted on horizontal axes at the top and bottom and adapted to swing or move up and down from upright to inclined positions with the pedals when depressed.

In the operation of the structure shown and described above, when the foot pedal is in a normally raised position, the plate and its flanges which reinforce the same and provide means of connection as described in mounting the plate, in addition to forming guide members are substantially vertical with the axes of the various pivots in alignment, but upon the depression of a foot pedal and its lever from the full line position shown in Fig. 1 to the dotted line position shown therein, or the position shown in Fig. 3, the lever will swing on the axis 26 and the flanges and plate will move on the pivot connections 44 as axes, but on a shorter radii than the lever to the dotted line position shown in Fig. 1. During this movement, the slots 46 will permit the bars and plate to ride on the respective lower pivots 44, allowing the necessary sliding movements of the plate and flanges to permit the parts to assume the relative positions illustrated. In this position the feet cannot pass beneath the pedals but will be guided or stopped by the bars and plates to insure placing of the feet upon the pedals and guided by the curved wings 47 or deflecting portions 48. Should the toe strike the plate, the foot will also be accurately directed and guided on to the pedal with the heel engaging the plate, but prevented from catching beneath the bottom edge of the pedal except sufficiently to prevent displacement of the foot with respect thereto, especially in view of the obtuse angled relation of the bottom edge of the pedal with respect to the vertical bars or flanges and plate. The lower slots 46 in the flanges 40 and 41 permit the parts to fold downwardly when the pedals are depressed, the slots permitting the necessary sliding movements of the plates and flanges over the pivots or screws 44 due to the variation in the arcs swung by the foot levers and plates or flanges as previously described and as will be clearly apparent from Figs. 1 and 3 of the drawing.

According to the present invention, the wings or plates 47 and their curved portions 48, in addition to serving to help direct the feet into proper position on the respective pedals 23 and 28, will also serve to prevent the feet from slipping laterally or sidewise from one pedal over and on to the other, that is to the left from the brake pedal or to the right from the clutch pedal or from straddling both pedals and should the feet strike the guide links at either side of a pedal, said links will act as guide plates or bars to help direct the feet in an upwardly sliding motion on to the respective pedals. This is particularly true with respect to the brake pedal where the foot is shifted from the accelerator pedal and slightly below the same in closer relation to the foot board. In removing the foot from the accelerator pedal and placing the same on the brake pedal the right foot will be lifted from the former and will ride along the right hand edge of plate 39, flange or bar 40 of the brake pedal and can be slid upwardly along the guide bar until the foot passes on to the brake pedal 23. If the foot is moved over so far to the left, it will engage the extension or wing 47, thus insuring that the foot will remain on the brake pedal. The left foot is normally on the floor or foot board and may be guided up either of the side links or guide bars, especially the left flange or bar 40 and on to the clutch pedal in the same manner as described in connection with the brake pedal and prevented from slipping too far to the right by the corresponding extension plate 47 of the right hand flange or bar 41 of the clutch pedal, thereby insuring that the left foot will remain on the clutch pedal and the top surface thereof. Moreover, in practice, the driver may learn to rely to some extent upon the guide plates or flanges, so that in an emergency both feet can be lifted and drawn toward one another but still prevented from moving too far toward each other to prevent their displacement from the respective pedals by the upwardly projecting guards produced by the extension plates 47. The curved portions 48 of the latter will also insure that the feet will be deflected and guided on to the respective pedals if placed too far to the left of the brake pedal or to the right of the clutch pedal, thus insuring safety in driving especially to the beginner but also to the experienced driver who will become accustomed to the use of the improvements as shown and described and by intuition avoid inaccurate placing of the feet. In this way catching of the shoes beneath the control pedals will be entirely avoided and serious mistakes and accidents resulting therefrom prevented. Of course, the plates 47 will serve as stops between the respective foot pedals 23 and 28 in upper or lower positions or any intermediate positions to serve the same functions and advantages already described. It is to be understood that the parts will vary in relative positions, sizes and angles in different cars but the present device may be accommodated to either and will not interfere with the operation of the acceleration pedal or the starter button which is usually positioned above and forwardly of the accelerator pedal. Also, adjustments may be provided for where desired, but the parts will be firmly connected for free pivotal action and to compensate for all variations in the arcs swung by the various parts due to the different radii on which the same operate.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

However, the device may be applied to the brake pedal only or to the clutch pedal only in case of change in structure so that it would only be necessary to apply the same to one or the other.

Having thus described my invention, what I claim as new and desire to secure by Letters Patent is:

1. An automobile foot pedal safety control including an imperforate plate pivoted to extend between the bottom edge of the foot pedal and to the foot board on a car provided with the pedal and occupying the entire space between the bottom edge of the foot pedal and the foot board.

2. An automobile foot pedal safety control including a plate pivoted to the bottom edge of the foot pedal and to the foot board on a car provided with the pedal and extending entirely between the bottom edge of the foot pedal and the foot board, and side members for said plate adapted to guide the feet on the pedal.

3. An automobile foot pedal safety control including a plate pivoted to the foot pedal near the lower edge thereof and to the foot board on a car provided with the pedal, said plate having bars at the sides thereof and a plate at the side of the pedal at the top of at least one of said bars and curved outwardly.

4. An automobile foot pedal safety control including a plate pivoted to the foot pedal and to the foot board on a car provided with the pedal, said plate having bars at the sides thereof and a plate at the top of at least one of said bars, curved away from the pedal.

5. The combination with the clutch and brake pedals of an automobile having levers pivoted between the floor and foot boards of the automobile, plates pivoted to the pedals and foot board, and having guides at the sides thereof, the upper ends of the inner guides extending above the pedals and curved toward each other.

6. The combination with the clutch and brake pedals of an automobile having levers pivotally mounted between the floor and foot boards of the automobile, plates pivoted to the pedals and foot board and having guides at the sides thereof, the upper ends of the inner guides extending above the pedals and curved toward each other, brackets pivotally and slidably connecting the plates to the foot board, said plates and guides having the pivotal connections thereof in alignment.

7. An automobile foot pedal safety control comprising in combination with the foot board and the pedal having a lever pivoted below the foot board, an abutment and guide plate member pivoted beneath the top engaging portion of the pedal and extending downwardly in close proximity to the foot board, and means on the foot board to pivotally and slidably mount the lower end of the abutment and guide member.

8. The combination with a foot operated control lever of an automobile having a pedal and operating through the foot board of the automobile, a vertical guide and abutment plate member pivoted between the bottom portion of the pedal and the foot board.

9. An automobile foot pedal safety control including a plate-like link pivoted to the bottom edge of the foot pedal and to the foot board on the car provided with the pedal and closing the entire space between the foot pedal and the foot board, said pedal having depending lugs and the plate-like link being pivoted to said lugs.

10. An automobile foot pedal safety control including a plate pivotally mounted to extend between the bottom portion of the foot pedal and foot board of a car provided with the pedal to close the space therebetween and guide members and the sides of the plate adapted to guide the feet on the pedal in conjunction with the plate.

11. An automobile foot pedal safety control including a plate to extend between and filling the space between the foot pedal and the foot board of a car provided with the pedal, said plate being pivoted on a horizontal axis near the bottom and adapted to move up and down from upright to inclined positions with the pedal and occupying the space beneath the latter substantially to the foot board.

VALERIUS POMERNACKI.